(12) United States Patent
Cogliandro et al.

(10) Patent No.: US 7,562,708 B2
(45) Date of Patent: Jul. 21, 2009

(54) METHOD AND APPARATUS FOR CAPTURE AND SEQUESTER OF CARBON DIOXIDE AND EXTRACTION OF ENERGY FROM LARGE LAND MASSES DURING AND AFTER EXTRACTION OF HYDROCARBON FUELS OR CONTAMINANTS USING ENERGY AND CRITICAL FLUIDS

(75) Inventors: John A. Cogliandro, Dedham, MA (US); John M. Moses, Dedham, MA (US)

(73) Assignee: Raytheon Company, Waltham, MA (US)

( * ) Notice: Subject to any disclaimer, the term of this patent is extended or adjusted under 35 U.S.C. 154(b) by 55 days.

(21) Appl. No.: 11/786,474

(22) Filed: Apr. 12, 2007

(65) Prior Publication Data

US 2007/0261844 A1 Nov. 15, 2007

Related U.S. Application Data

(60) Provisional application No. 60/799,090, filed on May 10, 2006.

(51) Int. Cl.
*E21B 43/24* (2006.01)
*E21B 43/40* (2006.01)

(52) U.S. Cl. ............... 166/248; 166/266; 166/267; 166/250.01; 166/272.1; 166/272.3; 166/302

(58) Field of Classification Search .......... None
See application file for complete search history.

(56) References Cited

U.S. PATENT DOCUMENTS 3,664,422 A * 5/1972 Bullen .......... 166/283

| | | |
|---|---|---|
| 4,108,760 A | 8/1978 | Williams et al. |
| 4,140,179 A | 2/1979 | Kasevich et al. |
| 4,196,329 A | 4/1980 | Rowland et al. |
| 4,363,717 A | 12/1982 | Pelrine et al. |

(Continued)

FOREIGN PATENT DOCUMENTS

| EP | 0 506 069 A1 | 9/1992 |
|---|---|---|
| WO | WO 94/20444 | 9/1994 |

OTHER PUBLICATIONS

AOC Petroleum Support Services, LLC, "Secure Fuels from Domestic Resources; the Continuing Evolution of America's Oil Shale and Tar Sands Industries", Jun. 2007, pp. 1-62, US Department of Energy.
Bsieso, M.S., "Jordan's Experience in Oil Shale Studies Employing Different Technologies", 2003, vol. 20, No. 3, pp. 360-370, Estonian Academy Publishers.

(Continued)

*Primary Examiner*—Zakiya W. Bates
(74) *Attorney, Agent, or Firm*—Baker Botts L.L.P.

(57) ABSTRACT

A closed loop system for increasing yield, reducing post process pollution, reducing energy consumed during and after extraction of fuels or contaminants in formations and for sequestering of carbon dioxide $CO_2$ from various sources is converted to a critical fluid for use as a flushing and cooling medium. Electrical energy heats a hydrocarbon rich formation resulting in the extraction of hot fluids which are fed to heat exchangers, gas/liquid separator, and steam turbine whereby oil, electric power, carbon dioxide and methane are produced for reuse in the system or for external use. Further, a method for sequestering of carbon dioxide in a formation comprises the steps of injecting $CO_2$ into the reservoir, flushing with cool pressurized $CO_2$ for heat removal, infiltrating with ultra-fine low density suspended catalyst particles of dry sodium hydroxide in $CO_2$, pumping water moistened $CO_2$ into the reservoir to activate the catalysts, binding the $CO_2$ with reacting materials and capping the reservoir.

53 Claims, 5 Drawing Sheets

U.S. PATENT DOCUMENTS

| | | | |
|---|---|---|---|
| 4,401,162 | A | 8/1983 | Osborne |
| 4,438,816 | A | 3/1984 | Urban et al. |
| 4,508,168 | A | 4/1985 | Heeren |
| RE32,302 | E * | 12/1986 | Almond et al. .......... 166/308.6 |
| 4,736,792 | A * | 4/1988 | Brown et al. ................ 166/402 |
| 5,055,180 | A | 10/1991 | Klaila |
| 6,190,301 | B1 | 2/2001 | Murray et al. |
| 6,669,917 | B2 | 12/2003 | Lyon |
| 6,702,016 | B2 | 3/2004 | Rouffignac et al. |
| 6,736,215 | B2 | 5/2004 | Maher et al. |
| 6,763,886 | B2 | 7/2004 | Schoeling et al. |
| 6,871,707 | B2 | 3/2005 | Karanikas et al. |
| 6,890,497 | B2 | 5/2005 | Rau et al. |
| 7,132,090 | B2 | 11/2006 | Dziedzic et al. |
| 2002/0046838 | A1 | 4/2002 | Karanikas et al. |
| 2002/0173682 | A1 | 11/2002 | DiTrllio et al. |
| 2004/0161364 | A1 | 8/2004 | Carlson |
| 2007/0137858 | A1* | 6/2007 | Considine et al. ........... 166/248 |

OTHER PUBLICATIONS

Burnham, A.K., "Slow Radio-Frequency Processing of Large Oil Shale Volumnes to Produce Petroleum-Like Shale Oil", Aug. 20, 2003, US Department of Energy.

Burnham, A.K., "Comparison of the Acceptability of Various Oil Shale Processes", 26$^{th}$ Oil Shale Symposium, Dec. 11, 2006, pp. 1-17, UCRL-Conf-226717.

Mut, Stephen, "Oil Shale and Oil Sands Resources Hearing", US Committee on Energy and Natural Resources, Apr. 12, 2005, US Committee on Energy and Natural Resources.

National Research Council, "Refining Synthetic Liquids from Coal and Shale", Nov. 1980, pp. 76-109, National Academy Press, Washington, D.C.

Okamoto, Ikuo et al., "Effect of Supercritical CO2 as the Organic Solvent on Cap Rock Sealing Performance for Underground Storage", 2004, Elsevier.

Sinağ, A., et al., Comparison of Retorting and Supercritical Extraction Techniques on Gaining Liquid Products from Göynük Oil Shale (Turkey), Energy Sources, vol. 26, pp. 739-749, 2004, Taylor & Francis.

Tucker, David J., et al., "A Comparison of Retorting and Supercritical Extraction Techniques on El-Lajjun Oil Shale", Energy Sources, 2000, vol. 22 pp. 453-463, Taylor & Francis.

Seebach, Linda, "Shell's Ingenious Approach to Oil Shale is Pretty Slick", Rocky Mountain News, Sep. 2, 2005, Rocky Mountain, Colorado.

* cited by examiner

METHOD AND APPARATUS FOR CAPTURE AND SEQUESTER OF CARBON DIOXIDE AND EXTRACTION OF ENERGY FROM LARGE LAND MASSES DURING AND AFTER EXTRACTION OF HYDROCARBON FUELS OR CONTAMINANTS USING ENERGY AND CRITICAL FLUIDS

This application claims the benefit of Provisional Application No. 60/799,090, filed May 10, 2006, which is incorporated herein by reference.

BACKGROUND OF THE INVENTION

1. Field of the Invention

This invention relates generally to the reduction of air and land pollution including thermal pollution resulting from the extraction of hydrocarbon fuels from a body of fixed fossil fuels in subsurface formations such as oil shale, and in particular to a method and apparatus for reducing greenhouse gases and residual heat in situ during and after the extraction of oil and gas from oil shale in situ utilizing any extraction process thereof. The invention also is applicable to heavy oil, aging wells, coal, lignite, peat and tar sands and may also be applied above ground in a batch or continuous type process. It may also be applied during and after the extraction of contaminants or residue from a body of fixed earth or from a vessel utilizing electrical energy and critical fluids (CF).

2. Description of Related Art

Oil shale, also known as organic rich marlstone, contains organic matter comprised mainly of an insoluble solid material called kerogen. Kerogen decomposes during pyrolysis into kerogen oil and hydrocarbon gases (or oil and gas), which can be used as generator fuels or further refined into transportation fuels, petrochemicals, or products. Shale oil and hydrocarbon gas (typically methane, $CH_4$) can be generated from kerogen by a pyrolysis process, i.e. a treatment that typically consists of heating oil shale to elevated temperatures, typically 300° to 500° C. Prior to pyrolysis, kerogen products at room temperature have substantial portions of high viscosity non-transformed material such that they cannot be accessed within the rock/sand matrix. After pyrolysis and removal the shale oil is refined into usable marketable products. Early attempts to process bodies of oil shale in situ by heating the kerogen in the oil shale, for example, using RF energy, injecting super-heated steam, hot liquids or other materials or by fire flooding into the oil shale formation, have not been economically viable even if fundamentally feasible (which some were not). Early and current attempts to process bodies of oil shale above ground to obtain the oil and gas in the oil shale, for example, by mining, crushing and heating the shale in a batch or continuous retort furnace, have not been environmentally feasible nor economically viable.

The in situ processes typically leave large amounts of residual energy and residual hydrocarbons in the ground which has unknown effects on the landscape and ecology and can be considered "wasted" energy. These processes also typically require large amounts of electrical energy which is usually provided by a power plant, either local or remote. The power plants may be fueled by fossil fuels such as coal or oil which produce greenhouse gases. This invention aims to optimize energy usage while minimizing both thermal, atmospheric (including "greenhouse gas") and surface pollution. A closed loop or semi-closed type process is envisioned.

It is well known to use carbon dioxide for enhanced or tertiary oil recovery by injecting carbon dioxide into existing reservoirs in order to pressurize them and maximize the output of oil and gas. This process has met with limited success and does not purpose to capture or sequester significant amounts of $CO_2$ in the reservoir.

Critical fluids are compounds at temperatures and pressures approaching or exceeding the thermodynamic critical point of the compounds. These fluids are characterized by properties between those of gases and liquids, e.g. diffusivities are much greater than liquids, but not as great as gases and viscosity is lower than typical liquid viscosities. Density of critical fluids is a strong function of pressure. Density can range from gas to liquid, while the corresponding solvent properties of a critical fluid also vary with temperature and pressure which can be used to advantage in certain circumstances and with certain methods.

Many techniques have been attempted or proposed to heat large volumes of subsurface formations (coal, lignite, shale, tar sands) in situ using electric resistance, gas burner heating, steam injection and electromagnetic energy such as to obtain oil and gas. For example, resistance type electrical elements have been positioned down a borehole via a power cable to heat the shale via conduction.

U.S. Pat. No. 4,140,179 issued Feb. 20, 1979 to Raymond Kasevich, et al. and assigned to Raytheon Company of Waltham, Mass. discloses a system and method for producing subsurface heating of a formation comprising a plurality of groups of spaced RF energy radiators (dipole antennas) extending down boreholes to oil shale. The antenna elements must be matched to the electrical conditions of the surrounding formations.

U.S. Pat. No. 4,508,168, issued Apr. 2, 1985 to Vernon L. Heeren and assigned to Raytheon Company, is incorporated herein by reference and describes an RF applicator positioned down a borehole supplied with electromagnetic energy through a coaxial transmission line whose outer conductor terminates in a choking structure comprising an enlarged coaxial stub extending back along the outer conductor. However, this approach by itself requires longer application of RF power and more variation in the power level with time. The injection of critical fluids (CF) will reduce the heating dependence, due solely on RF energy, simplifying the RF generation and monitoring equipment and reducing electrical energy consumed. The same benefit of CF is true if simpler electrical resistance heaters are used in place of the RF. Also, the injection of critical fluids (CF) increases the total output of the system, regardless of heat temperature or application method, due to its dilutent and carrier properties.

U.S. Patent Application Publication No. 2007-0137852 A1 published Jun. 21, 2007 and U.S. Patent Application Publication No. 2007-0137858 A1, published Jun. 21, 2007, describe an apparatus and method for extraction of hydrocarbon fuels or contaminants using RF energy and critical fluids, and they are incorporated by reference herein. While other in situ methods project years of heating by conduction, cracking and vaporization to get oil from shale, using RF energy to heat the shale and the critical fluid for forced convection and extraction reduces the time of production to weeks or months. The reduction in time also reduces the total amount of heat conducted to the surrounding formation after primary heating, improving the prevention of migration of liberated hydrocarbons. The RF/CF processes causes cracking of the kerogen at approximately 300° C. (a temperature lower than many other methods) and then use of $CO_2$'s partially miscible benefits further reduces the cracking temperature and viscosity and increases the diffusivity and ability to get the oil compounds to the surface at low temperature.

Therefore, electromagnetic energy is delivered via an antenna or microwave applicator similar to U.S. Pat. No.

4,196,329, issued Apr. 1, 1980 to Howard J. Rowland, et al., and assigned to Raytheon Company. The antenna is positioned down a borehole via a coaxial cable or waveguide connecting it to a high-frequency power source on the surface. Shale heating is accomplished by radiation and dielectric absorption of the energy contained in the electromagnetic (EM) wave radiated by the antenna or applicator. This is superior to more common resistance heating which relies solely on conduction to transfer the heat. It is superior to steam heating which requires large amounts of water and energy present at the site and also relies on conduction.

All of these heating methods leave residual heat and residual hydrocarbons in the formation after the processing is completed. The heat could be used to partially power the ongoing operation, reducing total energy consumption while removing part or all of the heat in the formation along with any associated thermal pollution. All of these methods also leave significant amounts (50-70%) of residual hydrocarbon in the formation. In most instances these hydrocarbons are now liberated and mobile and able to migrate toward undesirable areas such as aquifers, causing pollution. The period of mobility is related to many site specific and process specific factors, including primarily residual heat and the amount and type of residual oil. The longer the residual heat remains and the farther reaching it is, the higher the probability of residual oil and gas migration into other undesirable and unknown areas. Likewise, the more residual oil, and the lighter it is (thinner and more refined) the higher the probability of migration into undesirable and unknown areas.

The process described in U.S. Pat. Nos. 4,140,179 and 4,508,168 and other methods, using for example resistance heaters, requires a significant amount of electric power to be generated at the surface to power the process and does not provide an active transport method for removing the valuable hydrocarbon products as they are formed and transporting them to the surface facilities. Carbon Dioxide ($CO_2$) or another critical fluid, which also acts as an active transport mechanism, for both products and heat can potentially be capped in the shale after the extraction is complete thereby reducing greenhouse gases released to the atmosphere. The $CO_2$, utilized by the critical fluids process, can originate in production processes, gas wells, or be captured from the effluent of various industrial plants including power plants. It is envisioned that the onsite power plant that is powering the actual extraction process becomes a primary source of the $CO_2$ required for the process.

$CO_2$ sequestering has long been thought of as a desirable method for prevention and removal of greenhouse gases from the earth's atmosphere. With the goal of preventing or reducing global warming, $CO_2$ sequestering aims to reduce $CO_2$ emissions to the atmosphere at their source, such as $CO_2$ effluent from power plants and other large $CO_2$ producers. On a larger scale, removing excess $CO_2$ from the earth's atmosphere theoretically would also significantly contribute to the reduction of greenhouse gases.

There are many studies and schemes surrounding this subject, but most are hampered by the mobility of $CO_2$. $CO_2$ is a gas, and as such, is highly mobile. Like any gas under pressure, it flows to the point of lowest pressure, looking to escape back to the atmosphere, or other places with-in the formation where the pressure is lowest. This is a basic physical property of a gas, and particularly of a gas under pressure. Of the thousands of potential reservoirs in the US alone, only 2% to 30% are deemed potentially suitable for $CO_2$ sequestering, primarily due to this ability to escape. Experts in the field disagree on the potential for sequestering, as evidenced by the large disparity in suitable reservoirs, but most agree on the same basic mechanism. A suitable reservoir must have adequate porosity to accept the $CO_2$ and adequate strength and stability to contain it once injected. Typical reservoirs include abandoned coal mines, aging or abandoned oil wells, shale deposits, salt mines, lake beds, coal mines, deep sea, etc. Most are deemed inadequate because the porosity that makes them attractive on one hand, ultimately leads to the release of $CO_2$ on the other hand.

Even those potential reservoirs with reasonable porosity (i.e. they have sufficient capacity) will release substantial portions of the $CO_2$ over a period of time depending on the site conditions and pressure of the $CO_2$ due to that porosity. Some methods include injection of the C02 into a reservoir through abandoned oil wells, and then rely on well known well capping methods, such as cementing and mechanical sealing. Likewise, some formations that are acceptable for strength and leak containment lack the porosity to accept a significant amount of $CO_2$ unless it is pressurized to several atmospheres which increases the likelihood it will eventually escape. In order for these sites and others to be suitable for sequestering, the $CO_2$ must be chemically and/or physically bound to the formation.

U.S. Pat. No. 6,890,497 issued May 10, 2005 to Gregory H. Rau et al. and assigned to the U.S. Department of Energy discloses a method and apparatus for extracting and sequestering $CO_2$ from a gas stream wherein hydrating the $CO_2$ in the gas stream with an aqueous solution forms carbonic acid resulting in a $CO_2$ depleted gas stream, and reacting carbonic acid with carbonate forms a waste stream solution of metal ions and bicarbonate. The waste stream is released into a disposal site comprising a large body of water. This process has several disadvantages because it has a low $CO_2$ storage density and requires a large body of water for application. It also creates large amounts of carbonic acid changing the Ph and mineral composition of the body of water, affecting aquatic and plant life dependent on the body of water.

U.S. Pat. No. 7,132,090 issued Nov. 7, 2004 to Daniel Dziedzic et al. and assigned to General Motor Corp. discloses a process for removing carbon dioxide from a gaseous stream by diffusing gaseous carbon dioxide into water by passing the gaseous carbon dioxide through a microporous gas diffuser membrane and a catalyst specifically for carbon dioxide such as carbonic anhydrase to accelerate a conversion of the carbon dioxide to carbonic acid supported by a matrix. A mineral is added to the reaction so that a precipitate of carbonate salt is formed which can be stored for extended periods in the ground. However, this process requires multiple steps, and an extremely large microporous gas diffuser membrane to handle a volume of $CO_2$ significant enough to be practical for the reduction and sequestering of greenhouse gases.

Tar sands and oil sands are a combination of sand (primarily silica), water, hydrocarbons and other chemicals, metals and minerals. They exist around the world, with preponderance in the North American continent. The hydrocarbons are in the form of bitumen which accounts for about 5 to 20% by weight of the deposit and is often attached to a water layer that surrounds a sand/rock/metal particle. The bitumen can be recovered in a variety of ways, which are generally categorized by one of two methods, either mining and surface processing or in situ processing.

Typically, an in situ tar sand recovery scheme involves either fire flooding or steam injection to heat the bitumen until its viscosity is lowered such that it flows from the sand matrix. Most popular is the steam method, where high pressure steam provides heat that helps to separate the bitumen (oil) from the water/sand matrix, and then a series of pumps, pipes and wells bring the bitumen to the surface for further processing. The high pressure steam is typically delivered through a perforated horizontal metal pipe forming a "steam trunk", or a balloon of steam in an area. A second perforated horizontal tube for recovery of the excess water and oil products is located below the steam delivery tube, usually about 9 to 50 feet, comprising a system known as SAGD or Steam Assisted Gravity Drainage. While this process is effective and in common use, it has some serious drawbacks, such as primarily poor economics due to a ratio of oil produced to oil consumed, and water pollution and usage. The energy required to heat the steam is only marginally less than the energy recovered in the form of oil products. Substantial quantities of hot water and now post process mobilized oil are left in the ground, which have the potential to dissolve, mobilize or transport salts, metals including heavy metals, and other indigenous chemicals from their original naturally occurring locations to other geological locations including acquifers and other undesirable areas. Any improvement in the efficiency of the process, as categorized by energy consumption (i.e. oil recovery per unit of energy, e.g. barrels recovered per million BTUs) yield improvement, or product quality improvement should enhance the prospects for getting oil from these formations. Likewise, any reduction in the amount of steam or energy required to separate the oil from the water and sand matrix will be a welcome addition to the process, as it will increase the energy efficiency, lower the total amount of greenhouse gases generated and lower the amount of fresh water required to generate the steam, and therefore, reduce the amount of water effluent to the process that must be disposed of after recovery. Likewise, providing for a method of removing the residual oil from the formation and from recovered hot water is also a welcome addition to the process.

Several processes have been envisioned to improve the hydrocarbon separation from the sand matrix. Fyleman (U.S. Pat. No. 1,615,121) uses a dilute aqueous solution of alkali carbonate, hydroxide or silicate heated from 60° to 80° C. to help remove the oil from the sand matrix. Clark (U.S. Pat. No. 1,791,797) uses a polyvalent salt with an alkaline reagent to improve separation. U.S. Pat. No. 2,924,772 uses a diesel alkaline waste and water to help form layers for eventual separation. Willard, Sr. (U.S. Pat. No. 3,951,778) uses a warmed (40° C.-90° C.) silicate solution containing calcium and magnesium, surfactant and water to help with separation. Fischer (U.S. Pat. No. 2,903,407) also uses hydrocarbon based solvents and so on. These processes all rely on an above ground batch type mixing and contain compounds that may be undesirable in the end due to environmental concerns.

SUMMARY OF THE INVENTION

Accordingly, it is therefore an object of this invention to provide an efficient method and apparatus for extracting oil from shale and other substrates with low energy consumption and minimal pollution, while sequestering carbon dioxide ($CO_2$) at the completion of the extraction.

It is another object of this invention to provide a method and apparatus for capturing, using, re-using and dissipating heat from the earth or mass during extraction of hydrocarbon fuel from a body of fixed fossil fuels.

It is another object of this invention to provide a method and apparatus for a closed loop or nearly closed loop system for utilizing as much of the original input energy as possible during the extraction of kerogen oil and gas from oil shale or bitumen in tar sands.

It is a further object of this invention to provide a method and apparatus for effectively lowering the total energy consumed during the heating of oil shale or tar sands in situ by using critical fluids to reduce the total temperature required to attain miscible or movable hydrocarbons so they can be transported up or out through a well.

It is yet another object of this invention to reduce the migration of post process residual liberated hydrocarbons in an in situ recovery from a formation by using a minimal amount of targeted and targetable RF energy as the heat source, allowing for more specific heating of the desired compounds and a thermal and mechanical barrier to be produced within the formation It is another object of this invention to reduce the migration of liberated hydrocarbons in an in situ recovery by providing re-circulating critical fluid (CF) that sweeps a preponderance of those hydrocarbons to the surface for processing, leaving a lower total amount of liberated hydrocarbons in situ.

It is a further object of this invention to reduce the migration of liberated hydrocarbons in an in situ recovery by cooling a previously heated plot using re-circulating CF and reducing the viscosity of the liberated hydrocarbons to the point where they are no longer mobile.

It is yet another object of this invention to provide a method and apparatus to remove bound and residual water from tar sands before, during and after recovery of hydrocarbons from tar sands.

It is yet another object of this invention to provide a method and apparatus for effectively lowering the total energy consumed during the heating of oil shale or tar sands by using critical fluids to recover and use the heat input during removal of the hydrocarbons.

It is an object of this invention to dramatically increase the total number of acceptable reservoir sites for $CO_2$ sequestering, while increasing the performance and longevity of that sequestering in any formation by operating on the two primary weaknesses of most reservoirs and sequestering projects simultaneously.

It is another object of this invention to reduce the need for a reservoir to be strong with no leaks while also reducing the need for a high degree of porosity by using pressurized $CO_2$ and providing a binding agent for the pressurized injected $CO_2$, wherein the pressurization increases the density (and amount) of $CO_2$ injected and the binding agent provides for a subsequent reaction between the $CO_2$ and the formation, chemically binding the $CO_2$ to the formation in the form of carbonates, and the $CO_2$ may be supercritical, critical or subcritical.

It is yet another object of this invention to reduce heat pollution of a land mass during and after hydrocarbon or contaminate recovery.

It is a further object of this invention to provide a means for reducing heat pollution of a land mass during and after processes of any type.

It is another object of this invention to reduce oil, heavy metals and chemical pollution of a land mass during and after hydrocarbon or contaminate recovery.

These and other objects are further accomplished by providing a method for capturing and sequestering carbon dioxide and latent heat from large land masses comprising reducing energy and critical fluid requirements during and after extraction of hydrocarbons comprising generating carbon dioxide ($CO_2$) from one of an internal source and external source, providing the $CO_2$ as the critical fluid into a well with predetermined parameters of temperature and pressure to effect desired results, providing a catalyst to the well, providing heat energy to the well, processing hot fluids, including $CO_2$, $CH_4$, oil, steam/water and vapor obtained from the well, and converting the hot fluids into reusable $CO_2$, $CH_4$, electrical energy and water. The method comprises the step of providing the well with an input borehole and an extraction borehole. The step of providing a catalyst comprises the step of providing sodium hydroxide (NaOH). The method comprises the step of providing a mixer for combining and introducing the carbon dioxide and the catalyst to the well. The step of providing heat energy to the well comprises the step of using electrical energy to power the heating process. The step of providing heat energy to the well comprises the step of providing RF energy.

The objects are further accomplished by providing a method for sequestering carbon dioxide ($CO_2$) in a reservoir comprising the steps of injecting $CO_2$ into the reservoir, flushing the reservoir with cool, pressurized $CO_2$ to remove residual heat, providing a catalyst to the reservoir, infiltrating the reservoir with ultrafine, low density suspended particles of the catalyst in the $CO_2$, pumping moist $CO_2$ into the reservoir to activate the catalyst, binding said $CO_2$ with reacting materials and capping the reservoir. The step of providing a catalyst comprises the step of providing sodium hydroxide (NaOH) or the step of providing potassium hydroxide (KOH). The step of infiltrating the reservoir with ultrafine, low density, suspended particles of a catalyst in $CO_2$ comprises the optional step of lowering pressure to accelerate the deposition of the catalyst in the reservoir. The step of pumping moist $CO_2$ into the reservoir to activate the catalyst comprises the optional step of providing one of RF heat and another energy to accelerate binding of $CO_2$.

The objects are further accomplished by providing a system for reducing energy and critical fluid requirements during and after extraction of hydrocarbons comprising means for generating carbon dioxide ($CO_2$) from one of an internal source or external source of methane, means for providing the $CO_2$ as the critical fluid into a well, means for providing a catalyst to the well, means for providing heat energy to the well, means for processing hot fluids, including $CO_2$, methane ($CH_4$), oil, steam/water and vapor from the well, and means for converting the hot fluids into reusable $CO_2$, $CH_4$, electrical energy and water. The well comprises an input borehole and an extraction borehole. The system comprises an input tank opening and an extraction tank opening for an above ground batch or continuous flow plant process. The catalyst comprises sodium hydroxide (NaOH). The system comprises a mixer for combining and introducing the carbon dioxide and the catalyst to the well. The means for providing heat energy to the well comprises means for generating electrical energy. The means for providing heat energy to the well comprises means for providing RF energy. The means for processing hot fluids from the well comprises a heat exchanger coupled to a gas/liquid separator and a steam turbine. The steam turbine drives an electrical generator for providing electric power to a grid or for use in the system. The gas/liquid separator provides liquid oil to a secondary heat exchanger for generating heat through secondary heat recovery. The gas/liquid separator provides a gas, steam/water, $CO_2$ mixture to a distillation column. The distillation column provides carbon dioxide ($CO_2$) and methane ($CH_4$) for reuse within the system. The system comprises means for removing latent and residual water from the ground including tar sands. The system comprises means for removing water from the batch and continuous processes of tar sands.

The objects are further accomplished by providing a system for sequestering carbon dioxide ($CO_2$) in a reservoir comprising means for injecting $CO_2$ into the reservoir, means for flushing the reservoir with cool, pressurized critical or sub critical $CO_2$ to remove residual heat and increase volumetric efficiency, means for providing a catalyst to the reservoir, means for infiltrating the reservoir with ultrafine, low density suspended particles of the catalyst in the $CO_2$, means for pumping moist $CO_2$ into the reservoir to activate the catalyst, means for binding said $CO_2$ with reacting materials, and means for capping the reservoir. The catalyst comprises sodium hydroxide (NaOH) and potassium hydroxide (KOH). The means for infiltrating the reservoir with ultrafine, low density, suspended particles of a catalyst in $CO_2$ comprises means for lowering pressure in the formation to accelerate the deposition of the catalyst in the reservoir. The means for pumping moist $CO_2$ into the reservoir to activate the catalyst comprises means for providing heat to accelerate the catalyzed reaction of $CO_2$ with a mineral formation.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
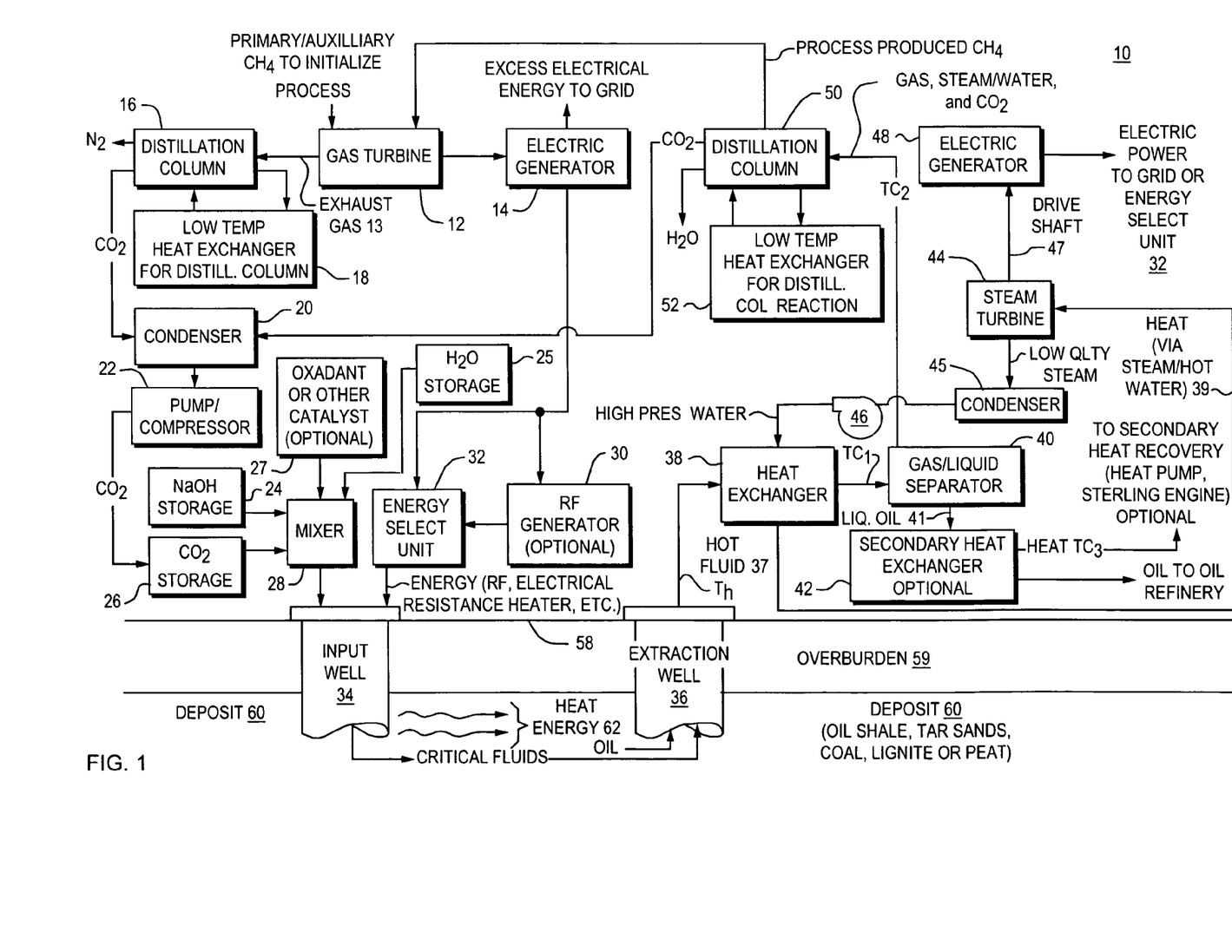
FIG. 1 is a block diagram of an efficient system for extracting kerogen oil and hydrocarbon gases from oil shale using energy and critical fluids and reducing greenhouse gases and residual heat in situ during and after such extraction according to the present invention.

Referring to FIG. 1, a block diagram of a system 10 is shown for extracting kerogen oil and hydrocarbon gases from oil shale using energy such as electro-magnetic energy from an RF generator and critical fluids such as carbon dioxide ($CO_2$) and reducing greenhouse gases and residual heat in situ during and after the extraction according to the present invention.

A gas turbine generator 12 receives a natural gas such as methane ($CH_4$) from an outside primary source to initialize the process or internally from the system 10 to operate the gas turbine generator 12 which is connected to an electric generator 14 for generating electricity for internal system 10 use or external uses. Any other type of electrical power generator may be substituted, including oil, coal and water powered generation. The gas turbine generator 12 provides exhaust gases which are channeled to a distillation column 16 where Nitrogen ($N_2$) and low pressure carbon dioxide ($CO_2$) are separated out. A low temperature heat exchanger 18 is connected to the distillation column 16 for generating low temperature heat for separation of $N_2$ and $CO_2$.

The carbon dioxide is sent to a condenser and mixer 20 which also receives recovered $CO_2$ from a second distillation column 50. The $CO_2$ from the condenser and mixer 20 is fed via a pump or compressor 22 to a $CO_2$ storage tank 26. A sodium hydroxide ($N_aOH$) (or other known catalyst or binding agent) storage tank 24 is also provided. The outputs of both storage tanks 24, 26 are fed to a mixer 28, and the output of the mixer 28 is fed to a borehole or input well 34 along with the energy source from energy select unit 32. The energy selected may be from an RF generator 30 or from the electrical generator 14 or from other sources such as a steam plant. The input well 34 extends below ground surface 58 into deposit 60.

Another borehole referred to as an extraction well 36 is provided for recovering kerogen oil and hydrocarbon gases, such as methane and carbon dioxide, from the oil shale 60 and bringing them to ground surface 58. The hot fluid 37 at temperature $T_h$ from the extraction well 36 includes oil, high pressure gas, super heated steam, vapors and other compounds. The kerogen oil and gases from the extracting well 36 are first sent to a heat exchanger 38 at a temperature $T_h$ which removes a predetermined amount of heat 39 and transfers this heat 39 to a steam turbine 44 for recovery of energy.

The heat exchanger 38 provides for recovering heat energy and sends the heat via steam or hot water to drive the steam turbine 44. The steam turbine 44 comprises a mechanical drive shaft 47 for driving an electric generator 48 which provides electric power to a grid or to the energy select unit 32. The steam turbine 44 also provides low quality steam to a condenser 45 which provides a low pressure liquid to a return pump 46. The pump 46 generates high pressure water for the heat exchanger 38 using common off-the-shelf technology and products. The kerogen oil, vapors and gases output from the heat exchanger 38 are at a lower temperature $TC_1$, and they enter an oil/gas separator 40 where liquid oil 41 is separated out and optionally sent to a secondary heat exchanger 42 where additional heat energy is removed from the oil, and the oil may then be sent to an oil refinery. The heat from the secondary heat exchanger at a reduced temperature of $TC_3$ is provided for secondary heat recovery such as to a heat pump or a sterling engine or to power distillation column heat exchangers. The oil/gas separator 40 also provides an output at temperature $TC_2$ of carbon dioxide, gas, steam/water, oil slurry to the distillation column 50. The relative magnitudes of the temperatures in degrees C. are $T_h=350$, $TC_1=200$, $TC_2=175$ and $TC_3=100$ where $T_h>TC_1>TC_2>TC_3$.

Although two boreholes are shown in FIG. 1, the input well 34 and the extraction well 36, other embodiments may include a plurality of extraction wells or a batch or a continuous type above ground processing plant. Further, as described in U.S. Patent Application Publication No. 2007-0137852 the input well and the output well may be combined.

Still referring to FIG. 1, the distillation column 50 receives the gas, steam, water, $CO_2$, slurry at temperature $TC_2$ from the oil/gas separator 40 and produces carbon dioxide ($CO_2$) for use within the system 10, methane ($CH_4$) for driving the gas turbine 12 and water ($H_2O$). The critical temperature ($T_c$) of methane is $-116°$ F. and the critical pressure ($P_c$) is 673.3 psiA. The critical temperature ($T_c$) of carbon dioxide is $88°$ F. and the critical pressure ($P_c$) is 1073 psiA. The distillation column 50 is connected to a low temperature heat exchanger 52 for distillation column reaction and separation of the methane ($CH_4$) gas.

The system 10 provides a method and apparatus for effectively lowering the total energy consumed during the heating of oil shale or tar sands in situ by using critical fluids to reduce the total temperature required to attain miscible or movable hydrocarbons so they can be transported up or out through a well. The injection of $CO_2$ into a formation at elevated temperatures in the 200-350° C. range and pressures in the 500- 5000 psi range reduces viscosity and increases the diffusivity of the oils and also serves to flush the oil from the formation to the production wells. This method is substantially below the 350-500° C. temperature range for other methods of getting oil from shale.

For example, a small plot of shale, approximately 20 acres, with a 500 foot thick seam of kerogen rich shale, at a depth of 500 feet supports a grid of injection and receiving wells. This plot requires a 10 to 20 MW power plant 12 which may be embodied by a Model PGT 16 manufactured by GE Gas Turbines of Atlanta, Ga. to power approximately 20-30 RF applicators of 50 KW each with the RF signal being generated by a series of Model 420 C 500 KW HF transmitters 30 manufactured by Continental Electronics Corporation of Dallas, Tex. A Critical Fluids flow rate of approximately 360 tons per hour is injected into the formation using a pump 22, Model Pinnacle LF-2000, manufactured by Sundyne Corporation of Arvada, Colo., for compression of the fluids, and a split ring floating head heat exchanger 38 may be embodied by Model LS-428U4, manufactured by Doyle and Roth of NY, N.Y. The heat exchanger 38 feeds oil-gas separator 40 which is manufactured by Blanchard-Ness of Saint-Hubert QC, and feeds a custom built distillation column 16, 50 manufactured by Riggins Incorporated of Hampton Va. Storage of NaOH, water and $CO_2$ is provided in storage tanks 24, 25, 26 manufactured by Zeyon, Inc. of Erie, Pa. The entire process can be scaled up or down, depending on project requirements. For example, General Electric and other power generation suppliers can provide co-generation type power plants that are much larger and more efficient than the PGT-16, such as the LM-6000.

Referring again to FIG. 1, the apparatus and method for capture and sequester of $CO_2$ and removal of latent heat from large land mass during and after extraction of hydrocarbons comprises the steps of using emissions from a power plant as a critical fluid, removing heat and residual hydrocarbons and other compounds from a formation after completion of oil extraction, reusing system heat to run generators and increase efficiency, and sequestering $CO_2$ underground at the end of hydrocarbon removal process.

Figure 2:
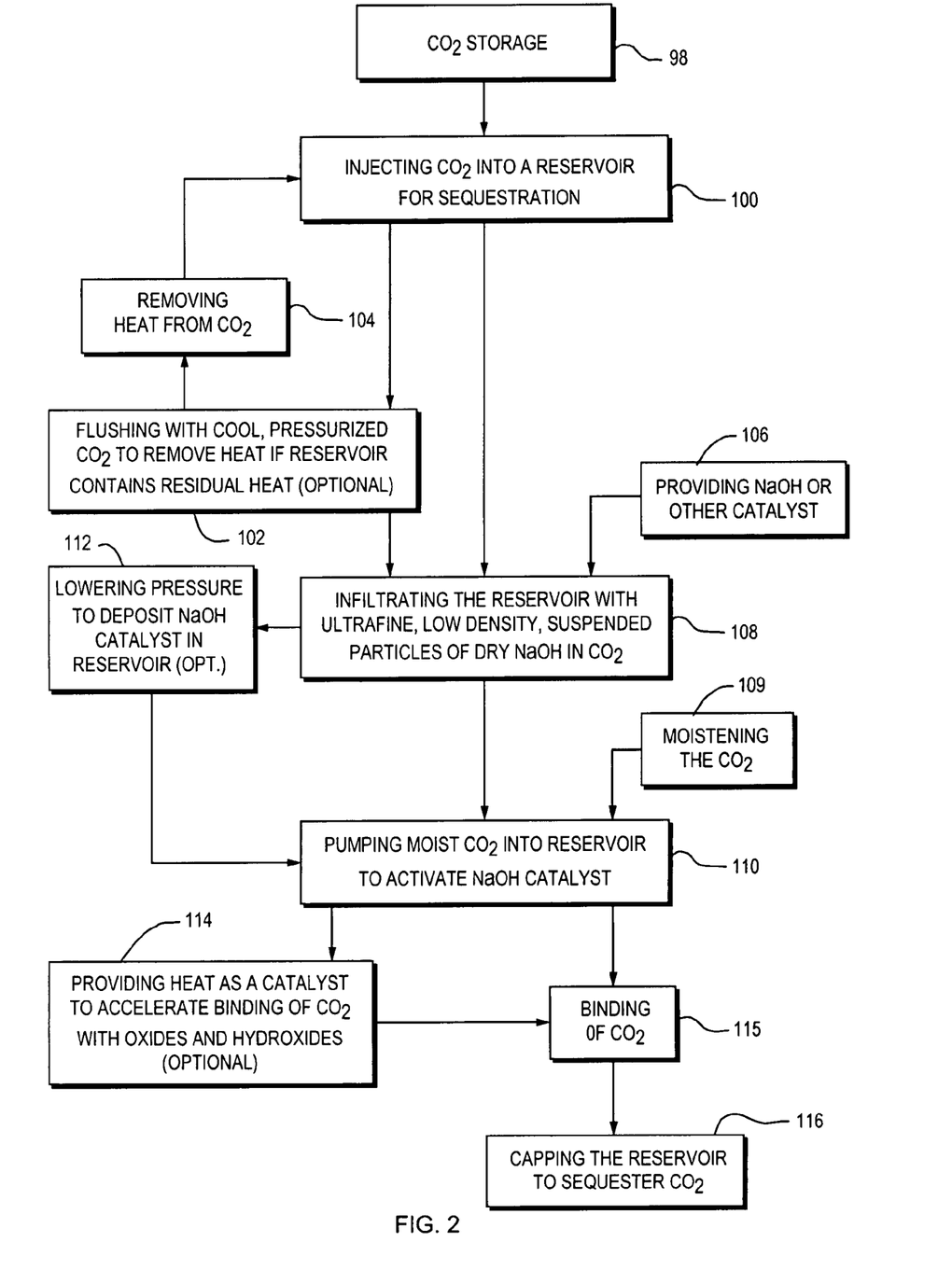
FIG. 2 is a flow chart of a method for sequestering $CO_2$ in a reservoir according the present invention.

Referring to FIG. 1 and FIG. 2, the apparatus and method is shown for sequestering carbon dioxide ($CO_2$) in a shale reservoir and other formations while recovering residual energy from that formation.

If $CO_2$ is injected into any reservoir at atmospheric pressure, its tendency to escape would be low. If the well heads and other orifices and all escape paths were cemented shut the $CO_2$ may remain there for long periods of time, essentially indefinitely. Unfortunately, the amount of $CO_2$ injected in this scenario is negligible, on the order of 0.1 lb per cubic foot of porosity. If this same reservoir were injected with $CO_2$ under pressure of 1000 psi, easily attained by common pumps, compressors, and piping equipment, the density would rise to between 100 and 500 times that of the atmospheric pressure example. The amount of $CO_2$ sequestered is now significant and desirable. The primary challenge is to keep it in the reservoir.

Since most shale and oil reservoir formations are composed of carbonates, oxides, and hydroxides of silicon, aluminum, iron, calcium, and other metals, a reaction which uses those substances to bind with the $CO_2$ is desired. While the $CO_2$ is not expected to bind with carbonates, it can combine with other minerals to form carbonates. Unfortunately, these reactions tend to be extremely slow in nature. By binding the $CO_2$ with the naturally occurring oxides or hydroxides, the $CO_2$ is stabilized in the formation. This binding of the $CO_2$ will eliminate the driving force for escape (pressure) which was originally required to inject the $CO_2$ at a sufficient density to make the project economically and environmentally feasible and desirable.

Referring to FIG. 2, a flow chart of the method for sequestering $CO_2$ in a reservoir is shown according to the present invention. In Step 98 $CO_2$ is provided from a storage area and step 100 provides for injecting $CO_2$ into a reservoir for sequestration. Next in optional step 102 flushing with cool, pressurized $CO_2$ occurs to remove heat, if the reservoir contains residual heat, and in step 104 the $CO_2$ is cooled and returned for injecting again into the reservoir. When the $CO_2$ and reservoir are sufficiently cooled, the next steps 106 and 108 provide for infiltrating the reservoir with ultrafine, low density, suspended catalyst particles of dry sodium hydroxide (NaOH) in $CO_2$ in order to insure the reaction rate so that the $CO_2$ can be stabilized before it is released. Also, potassium hydroxide may be used as a catalyst. This is followed in steps 109 and 110 by pumping moistened ($H_2O$)$CO_2$ into the reservoir to activate the NaOH catalyst. The physical form of the hydroxide must be such that it can be easily suspended in $CO_2$ and carried into the porous formation left by the extraction of fossil fuels. It is optional in step 112 to provide lowering the pressure of the formation or reservoir to more deeply and more rapidly deposit the NaOH catalyst in the reservoir. In step 114 it is optional to provide RF heat energy or other energy as a catalyst to accelerate binding of $CO_2$ with oxides and hydroxides in step 115. In step 116 capping the reservoir results in the sequestering of $CO_2$. In this method the sodium or potassium hydroxide and moisture catalyze the $CO_2$ and a rapid reaction with the minerals in the formation by reaction with hydroxides and/or oxides to form carbonates, bicarbonates, and other compounds depending on site conditions, resulting in the sequestration of $CO_2$ in greater capacity and stability.

It is also possible to inject $CO_2$ into a formation chosen to have a favorable chemical base, such as naturally occurring oxides including calcium oxide, hydroxides and carbonates. Then, RF heat energy can be used as a catalyst to accelerate the binding process and sequester the $CO_2$.

The chemical components and reaction mechanism for converting minerals and C02 into carbonate in situ is as follows:

where,
Δ—heat
s—solid
g—gas
l—liquid
NaOH—sodium hydroxide
$CH_3COOH$—acetic acid
$CO_2$—carbon dioxide
CaO—calcium oxide
$Ca(OH)_2$—calcium hydroxide
$Ca_2SiO_4$—calcium silicate
$CaCO_3$—calcium carbonate
$SiO_2$—silica Working on an injectable hydroxide, it is desirable to pick an element that is common, inexpensive and obtainable. In commercial rebreathing apparatus products (used in mining and diving) such as Sodasorb® (Registered Trademark of W.R. Grace & Co.), NaOH is used as a catalyst for the adsorption of carbon dioxide from oxygen onto calcium hydroxide. The present method operates on a similar principal such that the addition of NaOH in a nano-sized aerogel form can be easily suspended and carried into the formation. Typical formations for this method are any oil, gas, tar sands, salt or shale mine or well during or after the removal of kerogen, fossil fuels, heavy oils, etc.

The NaOH in this method is produced in a manner that allows it to achieve fluidity, injectability and mobility in fine structured composites. Typically nano-sized particles have these properties. The NaOH is made into a sub-micron sized aerogel. Typically, an aerogel has a base particle size of 10's of nano-meters. Aggregate particle size would be on the order of 1-10 microns, forming a fluffy amorphous solid capable of being suspended in fluids, gases and critical fluids.

Figure 5:
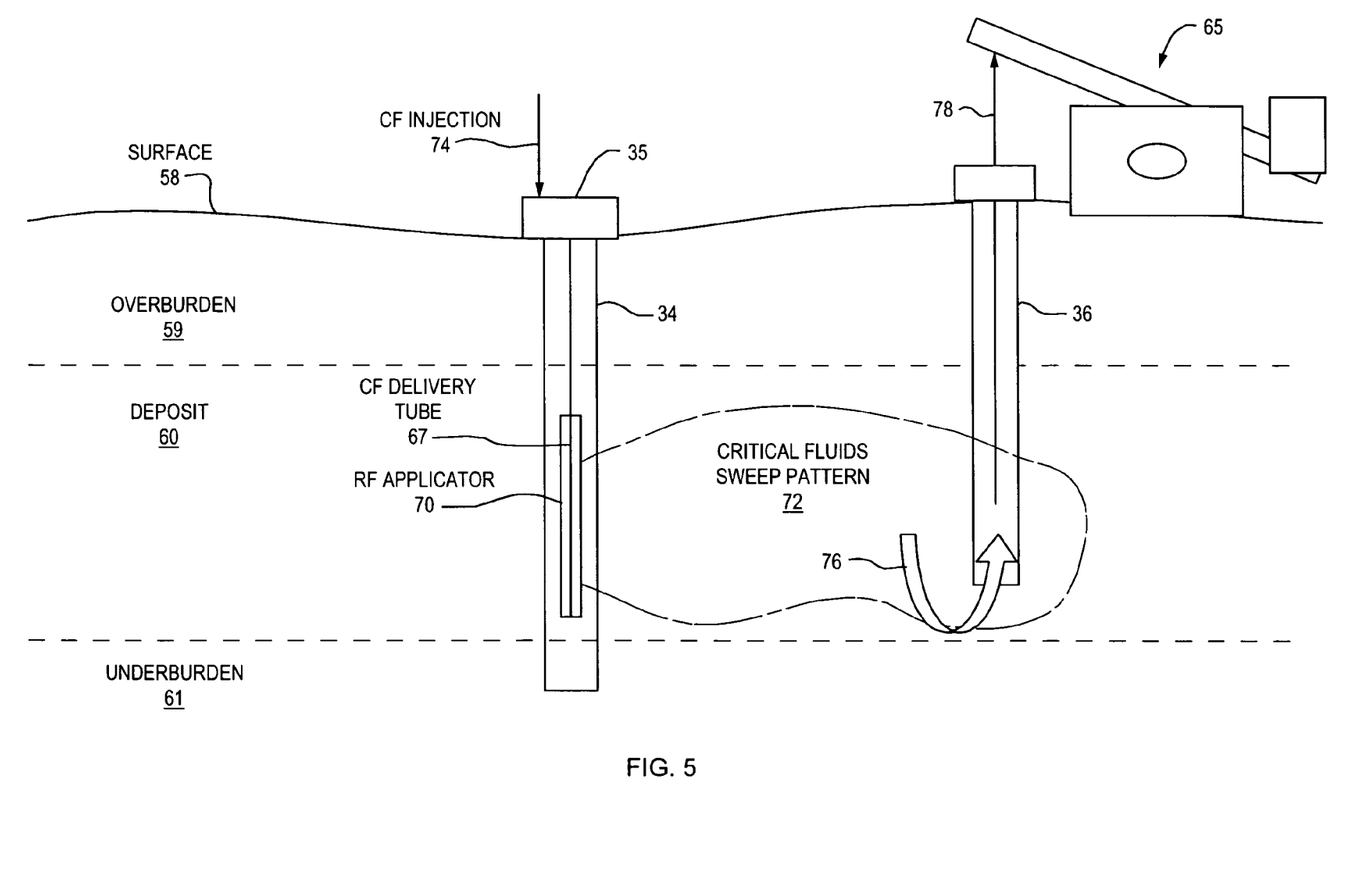
FIG. 5 is a diagram of a method for sweeping liberated elements, including hydrocarbons, from a formation and for cooling a formation using critical fluids according to the present invention.

Referring to FIG. 2 and FIG. 5, FIG. 5 is a diagram showing elements of a method for sweeping liberated elements including hydrocarbons from a formation and for cooling a formation using critical fluids according to the present invention. A critical fluid (CF) 74 such as carbon dioxide is injected via well head 35 down a borehole or well 34 and dispensed via a CF delivery tube 67 into the hydrocarbon rich deposit 60 which comprises the pay zone or area of discriminate heating via a sweep pattern 72 toward a second borehole or well 36. The critical fluid goes into the heated shale of deposit 60 and RF heat contributes to fracking and micro cracking of the shale which increases the permeability of the shale allowing the critical fluids to penetrate further and go in a direction and zone of least resistance. The overburden and underburden are less permeable zones as they have a lower porosity, lower level of micro cracking and are cooler in comparison to the target zone, providing a relative thermal and mechanical barrier for the process. The second well 36 provides for the extraction and transportation of critical fluids, hydrocarbons, water and other materials as desired 76 to the surface 58 with the assistance of a receiver pump 65. The deposit 60 is located below an overburden adjacent to the surface 58 and above an underburden 61 which is protected from indiscriminant heating. The harder, more dense, cooler overburden 59 and underburden 61 of the formation provides a barrier to critical fluids and liberated hydrocarbon migrations.

Critical fluids enhance several aspects of the in situ recovery of oils from formations. They dissolve the heavy oils usually associated with "tar sands" or "oil sands" producing a solution of much lower viscosity than the naturally occurring oil; this low viscosity allows it to more freely flow from the sand. The critical fluid sweeps away the bulk of oil in a relatively concentrated front, but also continues to "clean" more oil from the sand, resulting in higher yields than other processes. Water is somewhat soluble in critical carbon dioxide, so that if the water is a barrier to mass transfer, it can be removed by the $CO_2$. Most minerals and metals are insoluble in $CO_2$, therefore they are not mobilized or extracted by the $CO_2$. Critical fluids have very low viscosity and surface tension so that they rapidly and easily penetrate a variety of formations. By adjusting the temperature and pressure of the critical fluids, their solvent properties can be altered such that the more desirable light ends of oils and medium weight oils are extracted, and the asphaltenes and other heavy components that can hinder pipeline transportation of the oils are largely left behind. The critical fluids can be used as carriers for other materials to improve performance; this includes reactants to provide additional heat in situ or to improve product quality; surfactants to improve extraction of oils, water, or minerals; and catalysts to improve the reactions. Finally, the $CO_2$ can be sequestered in place once the extraction is complete.

For example, if the tar sands are 20% oil and 1% $H_2O$ then a critical fluid of primarily $CO_2$ would be able to absorb from 3 to 10% of the hydrocarbons and about $\frac{1}{10}^{th}$ to $\frac{1}{2}$ of 1% of water. If a commonly obtainable ration of 5% oil and $\frac{2}{10}^{ths}$ of 1% water soluble in the critical $CO_2$ is obtained, and a common solvent-to-feed (S:F) ratio of 1:6 is used, then for every volume of tar sands extracted most of the water (1.2%) and most of the oil/hydrocarbons may be removed from that volume of tar sands, either in situ or in an aboveground batch or continuous process. Various surfactants, absorbents and catalysts may be added to optimize the properties of the $CO_2$ for various desired outcomes.

Figure 3:
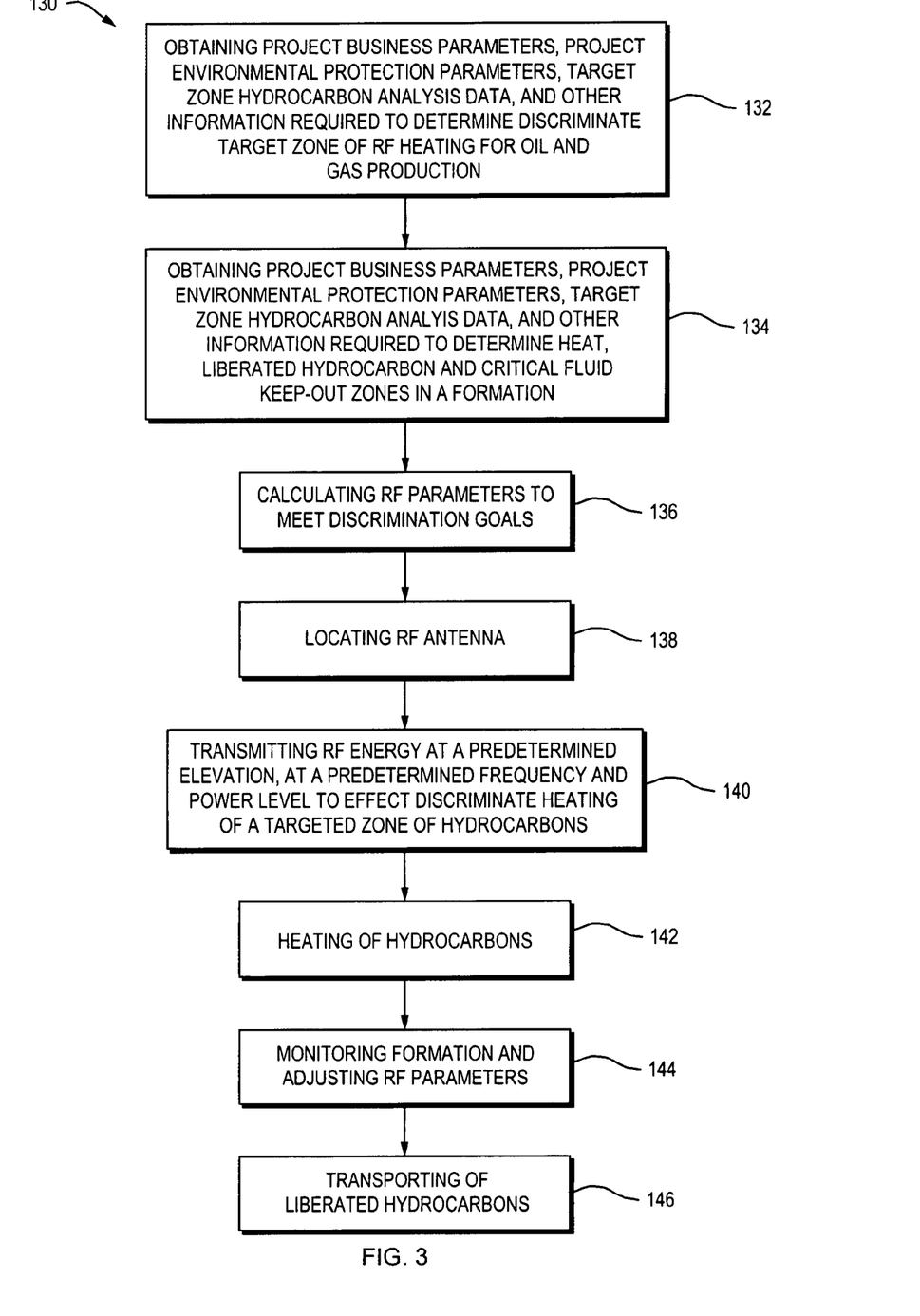
FIG. 3 is a flow chart of a method for limiting indiscriminate heating of a formation by tuning and targeting an RF signal in a reservoir according to the present invention
Figure 4:
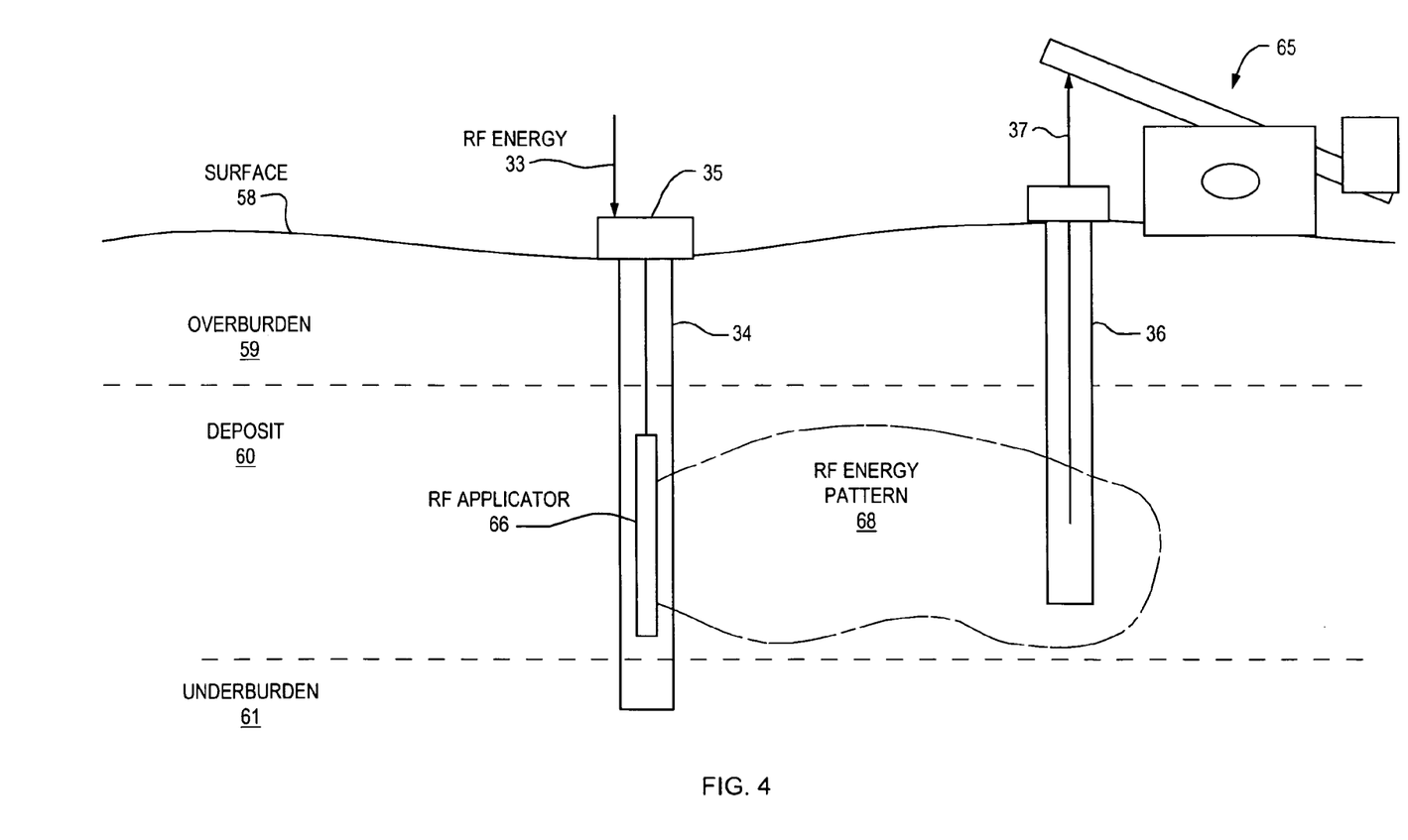
FIG. 4 is a diagram of a system for limiting indiscriminate heating of a formation by tuning and targeting an RF signal in a reservoir according to the present invention, providing a thermal and mechanical barrier.

Referring again to FIG. 3 and also FIG. 4, radio frequency heating improves in situ recovery of these oils in several ways. RF energy 33 rapidly penetrates formations to great distances which reduces the amount of drilling required and the time until oil is produced. RF energy, unlike steam, avoids the use of water and puts less stress on water restricted areas and reduces the mobilization of minerals by dissolving them in water, and reduces water pollution and consumption generally. RF heating eliminates the problems associated with processing oil water mixtures and emulsions, and targets the oil and tar with the heat to improve energy efficiency. RF energy is discriminate and only targets compounds with a high dielectric constant. Discriminate heating of hydrocarbons and water, both lossy, reduces the total energy required as compared to conductive heating methods which heat all the matter. A formation of interest for mining of minerals or production of oil may be analyzed and separated into zones. Some zones will have a desirable amount of unprocessed un-liberated hydrocarbons, such as kerogen in shale, and some zones will, due to economic, legal, or environmental parameters, be off limits for processing. The formation owner or processor may then analyze all relevant and technical and legal and business parameters and data and make determinations as to the area of desired heating and further processing. The area of desired heating can be targeted by adjusting various input parameters of the RF antenna and signal generator.

Referring to FIG. 3 and FIG. 4, FIG. 3 is a flow chart of a method 130 for limiting indiscriminate heating of a formation by tuning and targeting an RF in a reservoir according to the present invention. Step 132 comprises obtaining project business parameters, project environmental protection parameters, target zone hydrocarbon analysis data, and other information required to determine discriminate target zone of RF heating for oil and gas production. Step 134 comprises obtaining project business parameters, project environmental protection parameters, target zone hydrocarbon analysis data, and other information required to determine heat, liberated hydrocarbon and critical fluid keep-out zones in a formation. Calculating RF parameters to meet discrimination goals occurs in step 136 and step 138 comprises locating an RF antenna within the formation. Step 140 comprises transmitting RF energy at a predetermined elevation, at a predetermined frequency and power level to effect discriminate heating of a targeted zone of hydrocarbons. Step 142 comprises heating of hydrocarbons in the formation, and monitoring the formation and adjusting RF parameters in step 144 to achieve discriminate heating of the targeted zone of hydrocarbons and in step 146 transporting of liberal hydrocarbons.

Referring to FIG. 3 and FIG. 4, FIG. 4 is a diagram of a system for limiting heating of a formation by tuning and targeting a toroidal RF energy pattern 68 in a deposit 60 which comprises a hydrocarbon rich pay zone area of desired discriminate heating of a formation or reservoir in accordance with the method 130 shown in FIG. 3. The formation or reservoir comprises the overburden 59, the deposit 60 and the underburden 61.

RF energy 33 is applied via an injection well head 35 down a borehole or well 34 to an RF application or antenna 66 positioned within the deposit 60, and a RF energy pattern 68 is generated per calculated parameters. Another borehead or well 36 provides for the extraction and transporting of liberal hydrocarbons along with oil, gas and $CO_2$ 37 to the surface 58 with the assistance of a receiver pump 65. The deposit 60 is located below an overburden 59 adjacent to the surface 58 and above an underburden 61 which is the area to be protected from indiscrimate heating.

Calculating RF parameters to meet discrimination goals occurs in step 136 of FIG. 3, and step 138 comprises locating an RF antenna within the formation. Step 140 comprises transmitting RF energy at a predetermined elevation, at a predetermined frequency and power level to effect discriminate heating of a targeted zone of hydrocarbons. Step 142 comprises heating of hydrocarbons in the formation and monitoring the formation and adjusting RF parameters in Step 144 to achieve discriminate heating of the targeted zone of hydrocarbons and in step 146 transporting of liberated hydrocarbons.

Therefore, the targetable heat energy of RF can be selectively applied to an elevation of kerogen rich shale, or an elevation of hydrocarbon rich tar sands, thereby avoiding the indiscriminate heating of large surrounding land masses and surrounding materials, leaving those areas relatively cooler and thereby providing a mechanical and thermal containment of the process liberated oil and gas and water without the aid of an artificial mechanical barrier or freeze wall. When combining Critical Fluids and Radio Frequency heating for oil sands and tar sands, even greater efficiencies and economies can be achieved than with either alone.

The mechanism for this RF targeting improvement is as follows: Shale and Tar Sands are known as "lossy" matter, and more specifically the hydrocarbon/kerogen rich areas in shale are "lossy". That is, the dielectric constant is complex and has the form: $\mathcal{E}=\mathcal{E}'-j\mathcal{E}''$. The loss tangent is: $\tan\_\delta=\mathcal{E}''/\mathcal{E}'$. In common terms, the hydrocarbons have a "high dielectric constant" and are easily heated by the RF energy, in contrast to surrounding silica and other compounds which are not lossy and have low dielectric constants and are relatively RF inert. Even in uniform formations where most of the area is lossy, a properly tuned RF signal and antenna are such that the EM wave can be radiated with a known shape and distance.

Measurements of Oil Shale typically yield the results that the loss tangent in dry shale samples is greater than 0.25 (lossy) from 1 to 10 MHz. This is comparable with classical data from Dr. Arthur Von Hippel's book "Dielectric Materials and Applications". Kerogen is a very lossy medium, similar to dry loads use for terminations in RF equipment. The RF energy from 1 to 10 Mhz transmits in an approximate Toroidal (donut shaped) pattern emanating horizontally from a vertical antenna into the formation, with distinct upper and lower boundaries approximately 50 to 80% of the length of the antenna.

The wave number k, where $k=k'-jk''$ for lossy dielectric media, defines the instantaneous E field in the Z direction (perpendicular to the radiating monopole) and will vary as $e-k'' Z$ or $e-\alpha x$ where $\alpha$ is the attenuation constant. This calculation allows the user to determine the effect of the transverse electro-magnetic (TEM) wave. Since frequency and power input to the RF applicator can be easily varied, and the elevation or orientation of the entire apparatus can be easily varied, the horizontal and vertical coordinates of the RF energy, and therefore the heated formation, can be controlled as desired as seen in FIG. 4.

Therefore, the RF antenna as described in U.S. Pat. No. 4,508,168 will have a high and targetable attenuation in the shale medium, as it radiates a transverse electromagneic (TEM) wave into the shale, as demonstrated by Raytheon Company, the present assignee, in field and laboratory tests. If moisture is present, the water will also be heated and will eventually boil off and contribute to the heating.

This invention has been disclosed in terms of certain embodiments. It will be apparent that many modifications can be made to the disclosed methods and apparatus without departing from the invention.

Therefore, it is the intent of the appended claims to cover all such variations and modification as come within the true spirit and scope of this invention.

What is claimed is:

1. A method for reducing energy and critical fluid requirements during and after extraction of hydrocarbons comprising:
    generating carbon dioxide ($CO_2$) from one of an internal source and external source;
    providing said $CO_2$ as said critical fluid into a well with predetermined parameters of temperature and pressure;
    providing a catalyst to said well;
    providing heat energy to said well;
    processing hot fluids, including $CO_2$, $CH_4$, oil, steam/water and vapor obtained from said well;
    converting said hot fluids into reusable $CO_2$, $CH_4$, electrical energy and water; and
    using said electrical energy to provide heat energy to said well or for use in an external electric distribution grid.

2. The method as recited in claim 1 wherein said method comprises the step of providing said well with an input borehole and an extraction borehole.

3. The method as recited in claim 1 wherein said method further comprises the step of providing sodium hydroxide (NaOH) composition to said well.

4. The method as recited in claim 1 wherein said method comprises the step of providing a mixer for combining and introducing said carbon dioxide and said catalyst to said well.

5. The method as recited in claim 1 wherein said step of providing heat energy to said well comprises the step of providing RF energy.

6. The method as recited in claim 5 wherein said step of providing RF energy comprises the step of reducing the migration of residual liberated hydrocarbons in an in situ recovery from a formation by using a minimum amount of targeted RF energy as the heat source.

7. The method as recited in claim 1 wherein said step of processing hot fluids from said well comprises the step of providing a heat exchanger for receiving said hot fluids and providing a gas/liquid separator and a steam turbine coupled to said heat exchanger.

8. The method as recited in claim 7 further comprising said steam turbine driving an electric generator for providing said electrical energy.

9. The method as recited in claim 7 further comprising providing liquid oil from said gas/liquid separator to a secondary heat exchanger for additional heat recovery.

10. The method as recited in claim 7 further comprising said gas/liquid separator providing a gas, steam/water, and $CO_2$ mixture to a distillation column.

11. The method as recited in claim 10 wherein said method comprises the step of said distillation column providing carbon dioxide ($CO_2$) and methane ($CH_4$) for reuse within said system.

12. The method as recited in claim 1 wherein said method comprises the step of removing water from the formation including tar sands using re-circulating $CO_2$ critical fluids to remove the water.

13. The method as recited in claim 1 wherein said method comprises the step of re-circulating said $CO_2$ critical fluid for sweeping a preponderance of hydrocarbons to the surface for processing leaving a lower total amount of liberated hydrocarbons in situ.

14. The method as recited in claim 1 wherein said method comprises the step of cooling a previously heated formation or plot using a re-circulating critical fluid including said $CO_2$ thereby increasing the viscosity of liberated hydrocarbon to a point where it is less mobile.

15. The method as recited in claim 1 wherein said method comprises the step of cooling a previously heated formation or plot using a re-circulating critical fluid.

16. A method for sequestering carbon dioxide ($CO_2$) in a reservoir comprising the steps of:
    injecting $CO_2$ into said reservoir;
    flushing said reservoir with cool, pressurized $CO_2$ to remove residual heat;
    providing a catalyst to said reservoir;
    infiltrating said reservoir with ultrafine, low density suspended particles of said catalyst in said $CO_2$;
    pumping moist $CO_2$ into said reservoir to activate said catalyst;
    binding said $CO_2$ with reacting materials; and
    capping said reservoir.

17. The method as recited in claim 16 wherein said step of providing a catalyst comprises the step of providing a sodium hydroxide (NaOH) composition.

18. The method as recited in claim 16 wherein said step of providing a catalyst comprises the step of providing a potassium hydroxide (KOH) composition.

19. The method as recited in claim 16 wherein said step of infiltrating said reservoir with ultrafine, low density, suspended particles of a catalyst in $CO_2$ comprises the step of lowering pressure to accelerate the deposition of said catalyst in said reservoir.

20. The method as recited in claim 16 wherein said step of pumping moist $CO_2$ into said reservoir to activate said catalyst comprises the step of providing one of RF heat and another energy to accelerate binding of $CO_2$.

21. A method for capturing and sequestering of $CO_2$ and removal of latent heat from a large land mass during and after extraction of hydrocarbons comprising the steps of:
    using emissions from a power plant as a source of $CO_2$ for production of critical $CO_2$;
    removing heat from a formation after completion of oil extraction by flushing with recirculating critical fluids;
    reusing said heat from said formation to run electric generators and increase efficiency; and
    sequestering carbon dioxide in said formation when said extraction of hydrocarbons is completed.

22. The method as recited in claim 21 wherein said step of sequestering carbon dioxide in said formation comprises the steps of:
    injecting $CO_2$ into said reservoir;
    flushing and recirculating said reservoir with cool, pressurized $CO_2$ to remove residual heat;
    providing a catalyst to said reservoir;

infiltrating said reservoir with ultrafine, low density suspended particles of said catalyst in said $CO_2$;

pumping moist $CO_2$ into said reservoir to activate said catalyst;

binding said $CO_2$ with reacting materials; and capping said reservoir.

23. A method for limiting indiscriminate heating of a formation comprises the steps of:

obtaining information to determine a discriminate target zone of RF heating to obtain oil and gas production;

obtaining information to determine exclusion zones in said formation in which to substantially keep out heat, liberated hydrocarbons and critical fluid;

calculating RF parameters to meet said discrimination target zone and to exclude said exclusion zone;

locating an RF antenna in said formation to generate said discriminate target zone;

heating hydrocarbons in said discriminate target zone;

monitoring said formation to adjust said RF parameters to maintain said discriminate target zone and to exclude said exclusion zone; and transporting said liberated hydrocarbons, gas and liquids for processing.

24. The method as recited in claim 23 wherein said step of obtaining information to determine a discriminate target zone of RF heating comprises the step of obtaining project business parameters, project environmental protection parameters, and target zone hydrocarbon analysis data.

25. The method as recited in claim 23 wherein said step of obtaining information to determine zones to keep out heat, liberated hydrocarbons, and critical fluid comprises the step of obtaining project business parameters, project environmental protection parameters, and target zone hydrocarbon analysis data.

26. A system for reducing energy and critical fluid requirements during and after extraction of hydrocarbons comprising:

means for generating carbon dioxide ($CO_2$) from one of an internal source or external source of methane;

means for providing said $CO_2$ as said critical fluid into a well;

means for providing a catalyst to said well;

means for providing heat energy to said well;

means for processing hot fluids, including $CO_2$, methane, $CH_4$, oil, steam/water and vapor from said well;

means for converting said hot fluids into reusable $CO_2$, $CH_4$, electrical energy and water; and means for using said electrical energy to provide heat energy to said well or for use in an external electric distribution grid.

27. The system as recited in claim 26 wherein said well comprises an input borehole and an extraction borehole.

28. The system as recited in claim 26 wherein said system comprises an input tank opening and an extraction tank opening for an above ground batch or continuous flow plant process.

29. The system as recited in claim 26 further comprising means for providing a sodium hydroxide (NaOH) composition to said well.

30. The system as recited in claim 26 wherein said system comprises a mixer for combining and introducing said carbon dioxide and said catalyst to said well.

31. The system as recited in claim 26 wherein said means for providing heat energy to said well comprises means for generating electrical energy.

32. The system as recited in claim 26 wherein said means for providing heat energy to said well comprises means for providing RF energy.

33. The system as recited in claim 26 wherein said means for processing hot fluids from said well comprises a heat exchanger coupled to a gas/liquid separator and a steam turbine.

34. The system as recited in claim 33 wherein said steam turbine drives an electrical generator for providing said electrical energy.

35. The system as recited in claim 33 wherein said gas/liquid separator provides liquid oil to a secondary heat exchanger for generating heat through secondary heat recovery.

36. The system as recited in claim 33 wherein said gas/liquid separator provides a gas, steam/water, $CO_2$ mixture to a distillation column.

37. The system as recited in claim 36 wherein said distillation column provides carbon dioxide ($CO_2$) and methane ($CH_4$) for reuse within said system.

38. The system as recited in claim 26 wherein said system comprises means for removing latent and residual water from the ground including tar sands.

39. The system as recited in claim 26 wherein said system comprises means for removing water from the batch and continuous processes of tar sands.

40. A system for sequestering carbon dioxide ($CO_2$) in a reservoir comprising:

means for injecting $CO_2$ into said reservoir;

means for flushing said reservoir with cool, pressurized $CO_2$ to remove residual heat and increase volumetric efficiency;

means for providing a catalyst to said reservoir;

means for infiltrating said reservoir with ultrafine, low density suspended particles of said catalyst in said $CO_2$;

means for pumping moist $CO_2$ into said reservoir to activate said catalyst;

means for binding said $CO_2$ with reacting material; and means for capping said reservoir.

41. The system as recited in claim 40 wherein said catalyst comprises a sodium hydroxide (NaOH) composition.

42. The system as recited in claim 40 wherein said catalyst comprises a potassium hydroxide (KOH) composition.

43. The system as recited in claim 40 wherein said means for infiltrating said reservoir with ultrafine, low density, suspended particles of a catalyst in $CO_2$ comprises means for lowering pressure in the formation to accelerate the deposition of said catalyst in said reservoir.

44. The system as recited in claim 40 wherein said means for pumping moist $CO_2$ into said reservoir to activate said catalyst comprises means for providing heat to accelerate the catalyzed reaction of $CO_2$ with a mineral formation.

45. A system for capturing and sequestering of $CO_2$ and removal of latent heat from a large land mass during and after extraction of hydrocarbons comprising:

means for producing critical $CO_2$ using emissions from a power plant as a source of $CO_2$;

means for removing heat from a formation after completion of oil extraction;

means for reusing said heat from said formation to run electric generators and increase efficiency; and means for sequestering carbon dioxide in said formation when said extraction of hydrocarbons is completed.

46. The system as recited in claim 45 further comprises means for removing residual hydrocarbons from a formation after primary recovery of hydrocarbons (oils and gasses) using critical fluids.

47. The system as recited in claim 45 further comprises means for cooling the formation using circulating fluids to reduce viscosity of said hydrocarbons, oils, gasses and pollutants and to reduce mobility of unrefined and refined pre and post recovery process hydrocarbons and pollutants from said formation.

48. The system as recited in claim 45 further comprises means for providing RF energy to only target and energize a limited mass of said formation, thereby reducing mobility of unrefined and refined hydrocarbons and pollutants from a formation, reducing the relative viscosity of non-targeted hydrocarbons, oils and gasses and pollutants, reducing their relative mobility in the formation, and reducing the temperature of non-targeted formation elements providing for a thermal barrier against migration of heated elements.

49. The system as recited in claim 45 wherein said means for producing critical $CO_2$ using emissions from a power plant as a source of $CO_2$ comprises a distillation column coupled to a condenser.

50. The system as recited in claim 45 wherein said means for removing heat from a formation after completion of oil extraction comprises means for providing pressurized $CO_2$ to said formation and a heat exchanger for receiving said $CO_2$ from said formation.

51. The system as recited in claim 50 wherein said means for re-using said heat from said formation comprises a steam turbine connected to an output of said heat exchanger, said steam turbine being coupled to an electric generator.

52. The system as recited in claim 50 wherein said means for re-using said heat from said formation comprises a heat pump connected to an output of said heat exchanger, said heat pump being coupled to an electric generator.

53. The system as recited in claim 45 wherein said means for sequestering carbon dioxide in said formation comprises:
means for injecting $CO_2$ into said reservoir;
means for flushing and recirculating said reservoir with pressurized $CO_2$ to remove residual heat until a predetermined optimum temperature is reached for completion of a sequestering process, abandonment or a tertiary recovery;
means for providing a catalyst to said reservoir;
means for infiltrating said reservoir with ultrafine, low density suspended particles of said catalyst in said $CO_2$;
means for pumping moist $CO_2$ into said reservoir to activate said catalyst;
means for binding said $CO_2$ with reacting material; and
means for capping said reservoir.

* * * * *